J. FINN.
Machines for Molding Marble.

No. 134,532. Patented Jan. 7, 1873.

Witnesses.
S. N. Piper
L. N. Möller

James Finn.
by his attorney
R. H. Eddy

UNITED STATES PATENT OFFICE.

JAMES FINN, OF BOSTON, MASSACHUSETTS.

IMPROVEMENT IN MACHINES FOR MOLDING MARBLE.

Specification forming part of Letters Patent No. 134,532, dated January 7, 1873.

*To all whom it may concern:*

Be it known that I, JAMES FINN, of Boston, of the county of Suffolk and State of Massachusetts, have invented a new and useful or Improved Machine for Grinding Grooves in the Edges of Slabs of Stone or Marble; and do hereby declare the same to be fully described in the following specification and represented in the accompanying drawing, of which—

Figure 1:
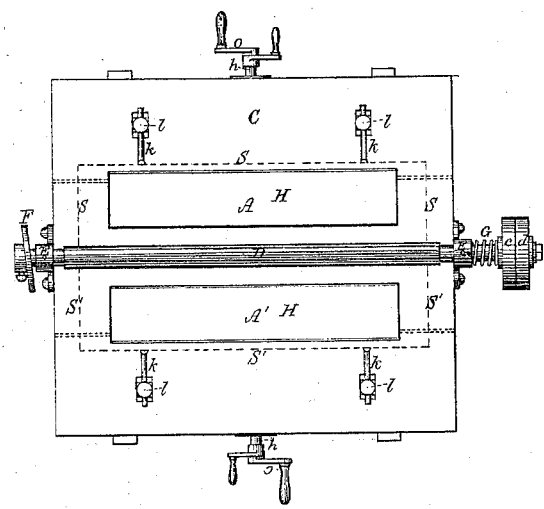
Figure 4:
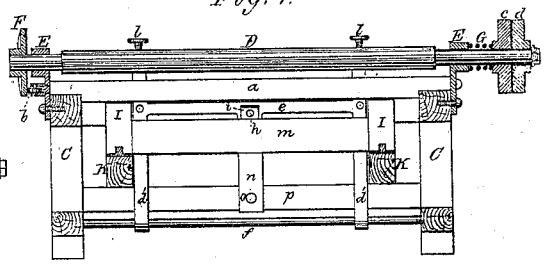
Figure 2:
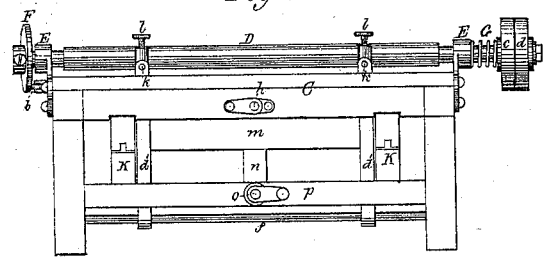
Figure 3:
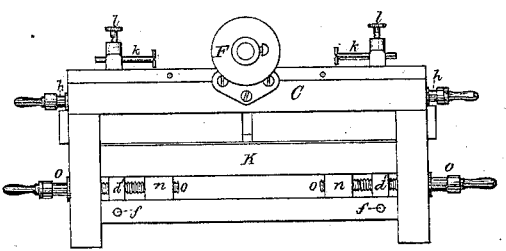
Figure 5:
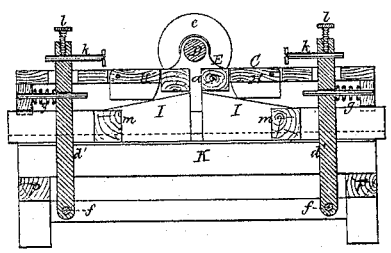
Figure 6:
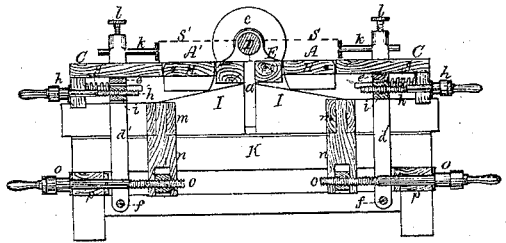

Figure 1 is a top view; Fig. 2, a front elevation; Fig. 3, an end view; Fig. 4, a longitudinal section; and Figs. 5 and 6, transverse sections, of it.

In the drawing, two slabs, A A', of marble, are represented at S S' by dotted lines as applied to the machine in the manner in which they are to be arranged for being molded or edge-grooved thereby. The table or frame of the machine is shown at C as having arranged directly over a groove, $a$, in its top, at the middle thereof, a rotary cylindrical grinder, D, whose journals are supported in box-standards E E, and formed of a suitable length to admit of the grinder being slid back and forth longitudinally while it may be in revolution, such lengthwise motions of it being effected by a disk-cam, F, and a spring, G. The cam is fixed upon one journal and bears against a friction-roller, $b$, arranged as shown. The helical spring G encompasses the other journal of the grinder, and bears at one end against one box-standard and at the other against a fast pulley, $c$, fixed on such journal, there being also in the journal a loose pulley, $d$, all as shown. On opposite sides of the grinder are automatic pressers for forcing the stones or slabs up to such grinder, and keeping them against it as it may grind into them. Each of such pressers is composed, mainly, of two upright arms, $d'$ $d'$, connected by a bar, $e$, and pivoted at their lower ends upon one of two rods, $f$, arranged in the frame in manner as shown. These bars extend up through slots in the table top, each bar being furnished with a helical spring, $g$, so arranged in the table as to press the bar forward or toward the grinder. There is to each presser a cranked screw, $h$, which is pivoted in the table and screwed into a rocker-nut, $i$, pivoted to the bar $e$ of such presser, all being arranged as shown. The springs constitute parts of and serve to advance the presser.

Furthermore, through each bar $d'$ a T-shaped slide or bearer, $k$, is extended, it being fixed in place by a clamp or screw, $l$, screwed downward into the bar and against the bearer. Thus the bearers become adjustable in the bars, such being to enable the presser to be adapted to a slab, whether its opposite edges be either parallel or out of parallelism. The cranked screw, which slides freely in the table, serves to retract the presser.

Furthermore, there are two movable platforms, H H, arranged within the table top, and on opposite sides of and near to the grinder. Each of these platforms rests on two of four inclined planes or wedges, I I, arranged as shown, and supported on a horizontal railway or two rails, K K. The two inclined planes I I of each pair are connected by a bar, $m$, having, projected down from its middle, an arm, $n$, to receive a cranked screw, $o$, arranged in the arm and applied to a table, $p$, of the frame or table in manner as shown.

By turning the crank of the screw $o$ the pair of planes I I may be either drawn back or advanced upon the railway. Drawing them backward will cause the platform H resting upon them to rise upward, and to correspondingly elevate the slab when resting on such platform. Each platform H may be pivoted near its outer corners to the table, so as when raised to incline the table; or it may be without any such pivots, so as to rise vertically.

Raising the platform will cause the grinder while in operation to grind downward into the slab, or to take off the lower sharp edge of cut or groove.

The elevator H and the automatic presser on either side of the grinder enable a person at one and the same time not only to elevate the slab, but to force it forward, thus causing the grinder to cut a larger groove than it would were the slab to be moved in one direction only against such grinder.

In the said machine, which in practice has been found very efficient, I make no claim to a longitudinal reciprocating and rotary grinder applied to a table as described.

What I claim is—

1. The combination of the elevating-platform or platforms H and their operative mechanism with the rotary grinder D and its supporting-table C, all being arranged substantially as and to operate as described.

2. The combination of the rotary grinder D, its supporting-table C, one or two elevators, H, and the operative mechanism thereof, and one or two pressers or means of automatically pressing the slab or slabs up to the grinder, all being substantially as described.

3. In each automatic presser, the combination of the adjustable bearers $k\ k$ and their clamp-screws $l\ l$ with the upright arms $d'\ d'$, connected and arranged as described.

JAMES FINN.

Witnesses:
R. H. EDDY,
S. N. PIPER.